US010405161B2

United States Patent
Mishra et al.

(10) Patent No.: US 10,405,161 B2
(45) Date of Patent: Sep. 3, 2019

(54) V2X CELLULAR COMMUNICATION SYNCHRONIZATION AND INITIATION INDEPENDENT OF A CELLULAR BASE STATION

(71) Applicant: Ford Global Technologies, LLC, Dearborn, MI (US)

(72) Inventors: Anjali Mishra, San Jose, CA (US); Yu Ho Lee, Pleasanton, CA (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/826,520

(22) Filed: Nov. 29, 2017

(65) Prior Publication Data

US 2019/0166451 A1    May 30, 2019

(51) Int. Cl.
| H04W 4/70 | (2018.01) |
| H04W 72/04 | (2009.01) |
| H04L 29/08 | (2006.01) |
| G01S 19/13 | (2010.01) |
| H04W 84/04 | (2009.01) |

(52) U.S. Cl.
CPC ............ *H04W 4/70* (2018.02); *H04L 67/12* (2013.01); *H04W 72/0453* (2013.01); *G01S 19/13* (2013.01); *H04W 84/042* (2013.01)

(58) Field of Classification Search
CPC ...................... H04W 4/70; H04W 72/0453
See application file for complete search history.

(56) References Cited

U.S. PATENT DOCUMENTS

| 7,061,426 | B1* | 6/2006 | Fey ........................ G01S 5/02 |
| 9,300,423 | B2 | 3/2016 | Rubin |
| 2011/0153140 | A1* | 6/2011 | Datta ...................... G06F 7/00 |
| 2012/0058777 | A1* | 3/2012 | Nguyen ................ H04W 24/00 |
| 2013/0051261 | A1* | 2/2013 | Kazmi ................... H04W 52/02 |
| 2014/0015660 | A1* | 1/2014 | Ogusa .................... B60Q 9/00 |
| 2015/0043444 | A1* | 2/2015 | Wei ..................... H04B 7/0621 |
| 2017/0289934 | A1 | 10/2017 | Sheng |

FOREIGN PATENT DOCUMENTS

| TW | 201720201 | 6/2017 |
| WO | WO-2017033486 A1 | 8/2015 |
| WO | WO-2017052687 A1 | 3/2017 |
| WO | WO-2017128956 A1 | 8/2017 |
| WO | WO-2017171909 A1 | 10/2017 |
| WO | WO-2017172927 A1 | 10/2017 |

\* cited by examiner

*Primary Examiner* — Ronald B Abelson
(74) *Attorney, Agent, or Firm* — David R. Stevens; Stevens Law Group

(57) ABSTRACT

A cellular vehicle-to-everything (C-V2X) [including V2V] communication system obtains location and time data from one or more GNSS signals and retrieves cellular synchronization information (including but not limited to 3GPP MIP and/or SIB) from a pre-loaded database and uses the information to establish a C-V2V connection with another vehicle. Synchronization may be repeated after expiration of a time period. The time period may be selected according to a location and velocity of the vehicle. Other sources of time data may be used when GNSS signals are not available, such as an internal crystal clock or timing from a cellular base station.

15 Claims, 5 Drawing Sheets

V2X CELLULAR COMMUNICATION SYNCHRONIZATION AND INITIATION INDEPENDENT OF A CELLULAR BASE STATION

BACKGROUND

Field of the Invention

This invention relates to vehicle-to-vehicle communication using cellular communication protocols.

Background of the Invention

Modern vehicles have many conveniences and safety features. Sensors such as RADAR, ultrasound, and cameras enable a vehicle controller to identify obstacles and potential collisions. One possible application of these features is in combination with vehicle-to-vehicle (V2V) communication to enable sharing of information and to inform vehicles of one another's presence.

Many wireless protocols exist for performing V2V communication such as WI-FI, DSRC (digital short range communication), BLUETOOTH, and the like. Cellular communication provides many benefits, such as longer range and higher bandwidth, but has not found widespread acceptance.

The systems and methods disclosed herein provide an improved approach to V2X cellular communication. Vehicle to Everything (V2X) protocols include V2V, vehicle-to-pedestrian (V2P), Vehicle-to-internet (V2I), etc. In this invention, V2X and V2V are used interchangeably.

BRIEF DESCRIPTION OF THE DRAWINGS

In order that the advantages of the invention will be readily understood, a reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Cellular V2V (C-V2V) communication system synchronization is performed in various ways according to the Third Generation Partnership Project (3GPP) standards. However, as indicated below, they do not meet National Highway and Transportation Safety Agency (NHTSA) requirements. Accordingly, vehicles implementing the 3GPP synchronization will not be permitted on US roads.

In one implementation, 3GPP C-V2V communication mandates use of signaling from a base station (eNB) for initial communication system synchronization, including clock synchronization. For the following reasons, this is not a viable solution:

1. 3GPP base stations provide clock synchronization with 0.2 ppm (parts per million) clock drift error. Given the NTSHA requirement, clock drift shall be within 0.1 ppm, there is a need for an alternate solution.
2. NHTSA requirements mandate timing synchronization from a GNSS (Global Navigation Satellite System) signal and no other source. Accordingly, synchronization using a base station is not permitted in a NHTSA complaint vehicle.
3. Another implementation of 3GPP C-V2V communication mandates use of signaling from GNSS and the SIM (Subscriber Identity Module)/USIM (Universal SIM)/eSIM of a cellular modem for initial communication synchronization including clock synchronization. However, using the SIM/USIM for system synchronization is not an optimal solution because the SIM/USIM is a separate device that will need to have a direct data path, an access mechanism, and processing methodology in the C-V2V system. In the case of a Cellular Vehicle to Everything (C-V2X) system the SIM/USIM may be separated from a main Telematics Control Unit (TCU) in some way, such as in the form of a standalone unit, daughterboard, or integrated hardware. There is no 3GPP modem signal available for initial synchronization in such implementations. Further, all these implementations must incorporate information exchange between hardware and software. This adds to hardware and software design and implementation expense for the manufacturer. Even an integrated C-V2X and TCU design may not permit sharing of SIM/USIM information due to security reason.
4. The SIM/USIM contains the identity of the user (driver). Continuous access of SIM/USIM poses security concern and may cause violation of driver anonymity.
5. In yet another implementation, initial synchronization of C-V2V communication system is achieved by using preconfigured modem core information until the 3GPP base station signal is available. This solution has the same inherent issues as the other options described above.

Hence, all the above options in 3GPP standards are expensive to the manufacturer and still do not meet NHTSA mandates for clock synchronization and privacy protection. The systems and methods disclosed herein implement C-V2V communication in a manner overcoming all of the above-noted deficiencies.

Figure 1A:
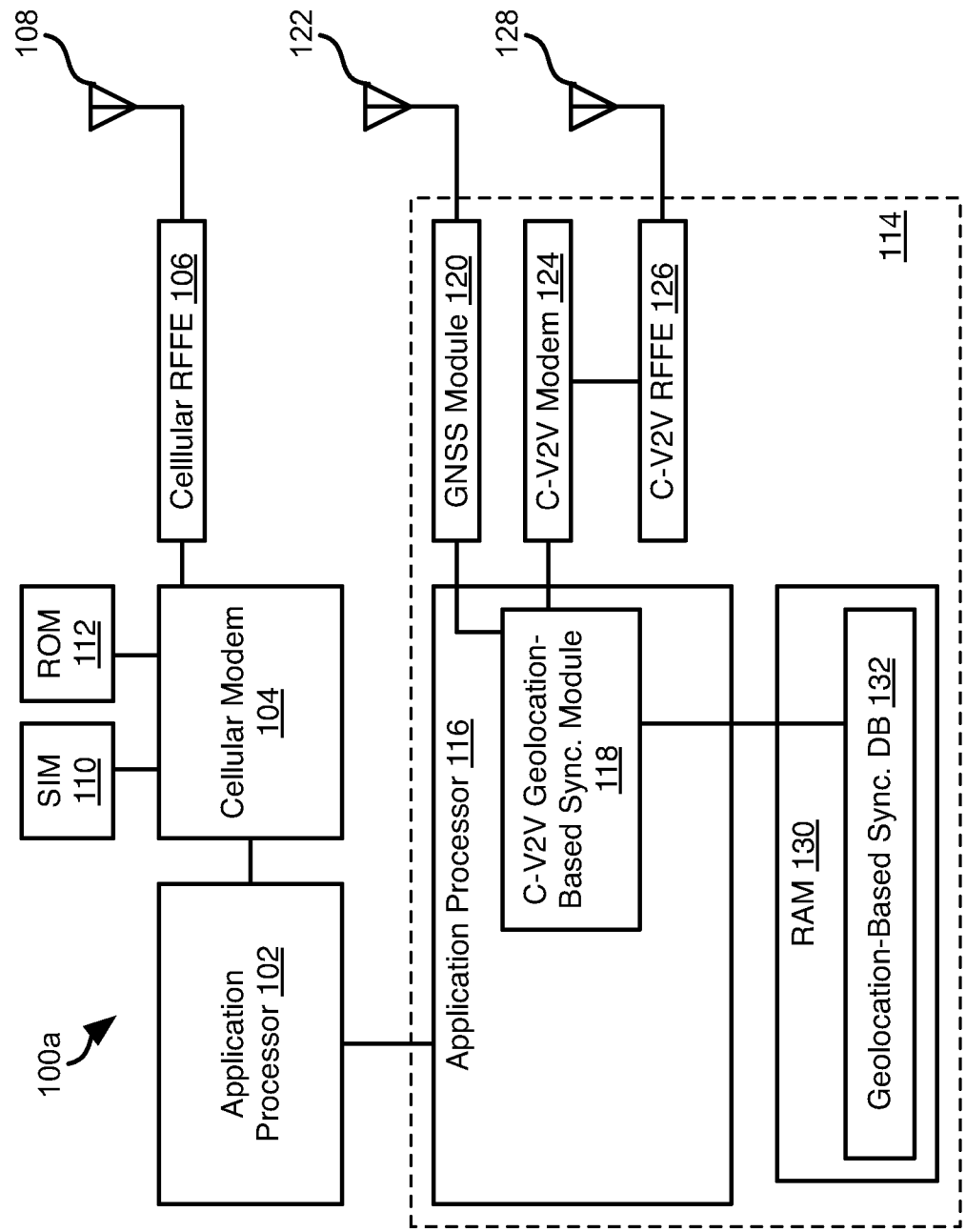
FIGS. 1A to 1D are schematic block diagrams of communication systems for implementing cellular V2V communication in accordance with an embodiment of the present invention.

Referring to FIG. 1A, a vehicle communication system 100a for use according to the methods described herein may have some or all of the illustrated components. The communication system 100a may be part of a TCU (Telematic Control Unit) of a vehicle. The system 100a may include an application processor 102 that executes one or more mobile communication functions, such as voice calls, web browsing, retrieving navigation information, sharing diagnostic information or the like.

The application processor 102 performs wireless communication through a cellular modem 104 coupled to a cellular Radio Frequency Front End (RFFE) 106 that is coupled to an antenna 108. The cellular modem 104 and RFFE 106 may implement any cellular communication protocol known in the art such as 3G (Generation), 4G, LTE (Long Term Evolution), 5G, or the like.

The cellular modem 104 may include or access a SIM (Subscriber Identification Module) 110 and ROM (Read Only Memory) 112. The SIM 110 may encode an identifier for a subscriber and may additionally include sensitive information, such as mobile payment information and contacts. As known in the art, the SIM 110 may be used to authenticate the subscriber in order to obtain access to a cellular communication network.

V2V communication has inherent risks inasmuch as communication with unverified systems is performed routinely. Additionally, carriers charge for communication over a cellular network such that the frequent V2V communications would result in significant expense for a subscriber. Additionally, some carriers may charge vendors that wish to implement services that require access to the SIM 110.

Accordingly, in the illustrated embodiment, the communication system 100a may further include separate cellular vehicle-to-vehicle (C-V2V) system 114 that performs V2V communication according to cellular protocol independent of the cellular modem 104 and without requiring SIM-authenticated communication.

The C-V2V system 114 may include a separate application processor 116 that implements V2V functions. Such functions may include the exchange of information regarding vehicle locations, potential obstacles, or other information necessary to implement any V2V functionality known in the art.

The application processor 116 may also implement a geolocation-based synchronization module 118 (hereinafter "synchronization module 118") that enables cellular communication between vehicles without communication with a cellular base station, as described below with respect to FIGS. 2 and 3.

The synchronization module 118 may communicate with a global navigation satellite system (GNSS) module 120 having a corresponding antenna 122. The GNSS module 120 receives signals from one or more satellite navigation systems such as some or all of the Global Positioning System (GPS), GLONASS (Russian Satellite Navigation System), and Galileo (European Satellite Navigation System) BDS (BeiDou Navigation Satellite System, China). As known in the art, these signals may be resolved to determine the receiver's position as well as a current time with high precision.

A separate C-V2V modem 124 and C-V2V RFFE 126 are coupled to a separate antenna 128. The modem 124 and RFFE 126 may communicate according to any cellular communication protocol known in the art such as 3G, 4G, LTE, 5G, or the like. The synchronization module 118 may communicate using the modem 124 and RFFE 126 in order to implement one or both of the methods described below for V2V communication without use of a cellular base station.

The synchronization module may access RAM (random access memory) 130 storing a geolocation-based synchronization database 132. As described in detail below, the database 132 stores data sufficient to set up a cellular communication channel between vehicles throughout a geographic region, such as an entire country, continent, or globally. The database 132 defines cellular regions and communication parameters for these regions, such as a frequency, range of frequencies, or ranges of frequencies for a particular region. The database may define a Master Information Block (MIB) and Secondary Information Block (SIB) according to the Third Generation Partnership Project (3GPP). A cellular region may be defined as central location and a radius from that central location or as one or more locations defining a perimeter of the cellular region. As known in the art of cellular communications, cellular regions may overlap one another but are preferably arranged such that frequencies used within adjacent cellular region do not overlap one another.

The geolocation-based synchronization database 132 may be preloaded in a chipset of a communication system 100a, 100b at the time of manufacture or as a firmware update. However, the database 132 does not require communication with a cellular base station for use or for updating at any time. In this manner, use of a cellular modem 104 and its corresponding SIM 110 is avoided.

As is apparent in FIG. 1A operation of the application processor 116 is in bypass of the cellular modem 104 and does not require access to the SIM 110 or any other communication with a cellular base station of a carrier.

Figure 1B:
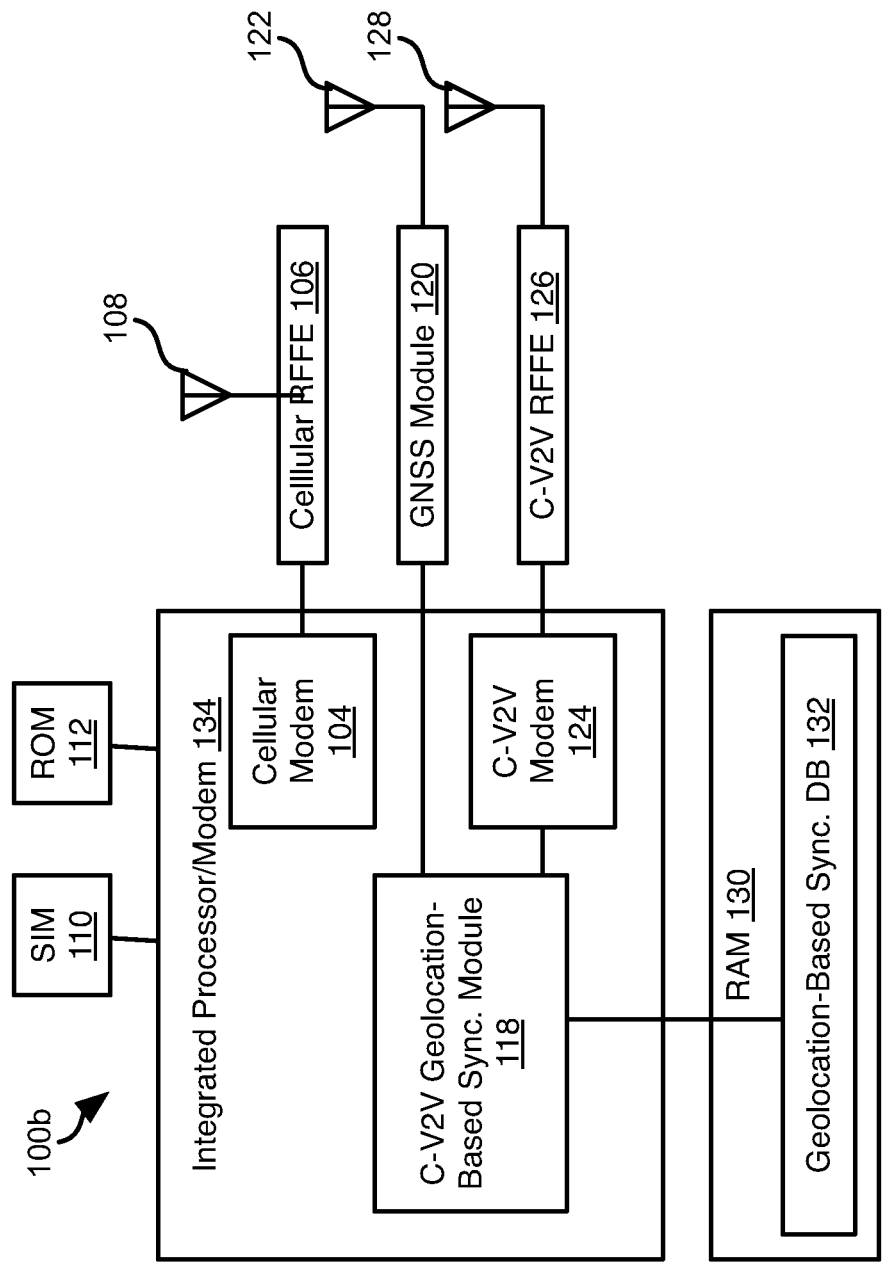

FIG. 1B illustrates an alternative embodiment 100b of a communication system. In the illustrated embodiment, the functions of the application processors 102, 116 and modems 104, 124 are implemented by a single integrated module 134. In such an embodiment, the synchronization module 118 and C-V2V modem 124 may exist as separate circuits or processes that are isolated from other cellular communications that use the SIM 110 using the cellular RFFE 106 and antenna 108.

Figure 1C:
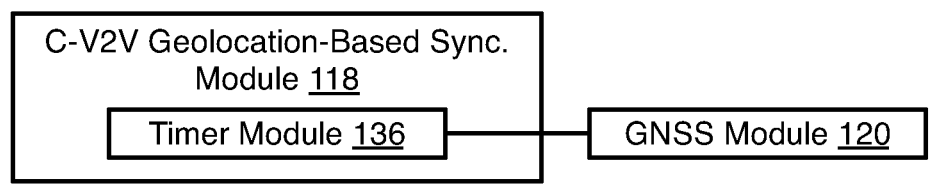

FIG. 1C illustrates an alternative implementation that may be used in either of the communication systems 100a, 100b. A timer module 136 is included in the synchronization module 118. The timer module 136 invokes re-synchronization based on GNSS signals upon expiration of a timer to account for movement of a vehicle housing the communication system 100a, 100b. An example method for synchronization using the timer module 136 is described below with respect to FIG. 3.

Figure 1D:
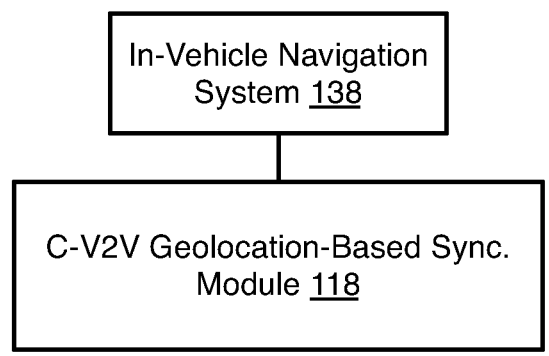

Referring to FIG. 1D, in some embodiments, an in-vehicle navigation system 138 detects GNSS signals and provides location and time information for use according to the methods disclosed herein. This approach may be used using the communication systems 100a or 100b. In such embodiments, the GNSS module 120 and antenna 122 may be omitted or may be retained to provide redundancy.

Figure 2:
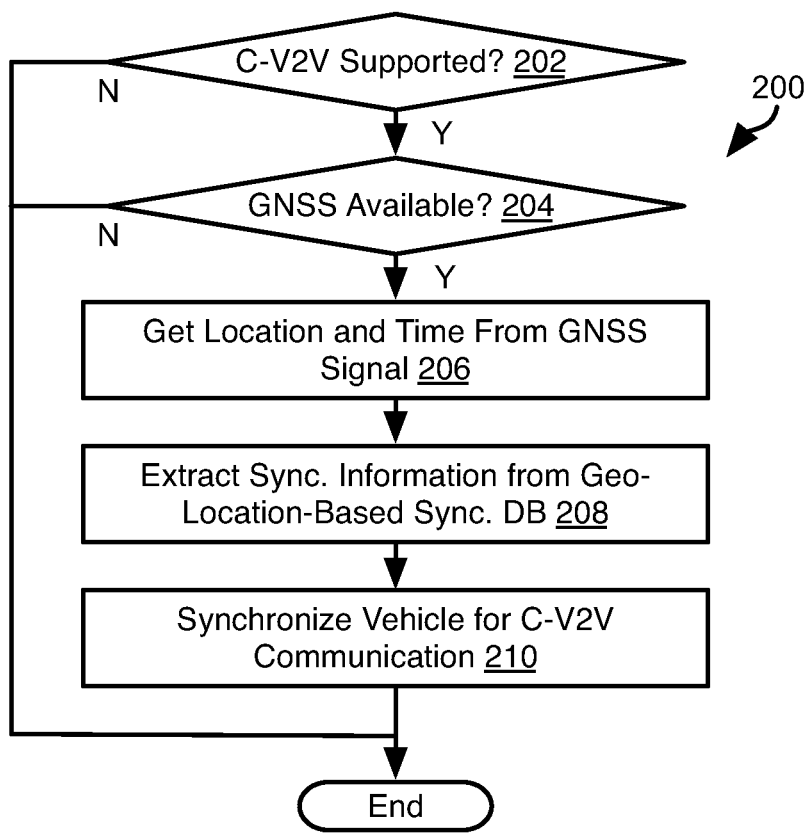
FIG. 2 is a process flow diagram of a method for synchronizing a cellular V2V communication system in accordance with an embodiment of the present invention.

FIG. 2 illustrates an example method 200 for synchronization that may be performed using the embodiments of 100a or 100b. The method 200 may be executed by the C-V2V geolocation-based synchronization module 118 implemented by a separate application processor 116 of FIG. 1A or the integrated module 134 of FIG. 1B. The method 200 may be performed using signals received from the GNSS module 120 and the C-V2V antenna 128 by way of the C-V2V RFFE 126 and C-V2V modem 124.

The method 200 may include evaluating 202 whether the vehicle communication system supports C-V2V communication and evaluating 204 whether a GNSS signal is available from one or more satellites of one or more GNSS systems. If a result of either of these evaluations 202, 204 is negative, the method 200 ends. If the results of both of these evaluations are positive, then the method continues at step 206 where a location and time are derived from one or more GNSS signals from one or more satellites of a GNSS system. As known in the art, signals from multiple satellites may be required to obtain a location. However, a time may be obtained from a signal from a single satellite, which may be sufficient in some cases. For example, a location may be derived using dead reckoning using an inertial measurement unit (accelerometer, compass, etc.) or using a GNSS receiver from another component of a vehicle, such as a navigation system.

The method 200 may then include extracting 208 synchronization information from the geolocation-based synchronization database 132 for the location determined at step 206. In particular, a cellular region including the location may be determined and the corresponding entry in the database 132 for that cellular region may be extracted. As noted above, this entry may include a frequency, range of frequencies, or ranges of frequencies for a particular region. The entry may include a Master Information Block (MIB) and possibly a Secondary Information Block (SIB), according to the Third Generation Partnership Project (3GPP), and other system and timing synchronization parameters.

The method 200 then includes synchronizing 210 the communication system 100*a*, 100*b* for C-V2V communication with another vehicle. This may include using a time measured from the time obtained from step 206 as a time stamp for communications thereby enabling two vehicles communicating using C-V2V to use clocks that are synchronized within an acceptable level of error due to synchronization using the GNSS signals. Synchronization 210 may be performed in both the time domain and the frequency domain.

Likewise, step 210 may include negotiating allocation of frequencies among vehicles according to the frequencies available for the cellular region. For example, frequencies and time may be negotiated among two or more vehicles in the cellular region according to the PC5 cellular communication protocol.

Following successful completion of step 210, the communication system 100*a*, 100*b* may then carry on V2V communication to implement any V2V functionality known in the art, such as sharing of a vehicle's location, sharing locations of potential obstacles, or information regarding other potential hazards and Basic Safety Message (BSM) related information.

Figure 3:
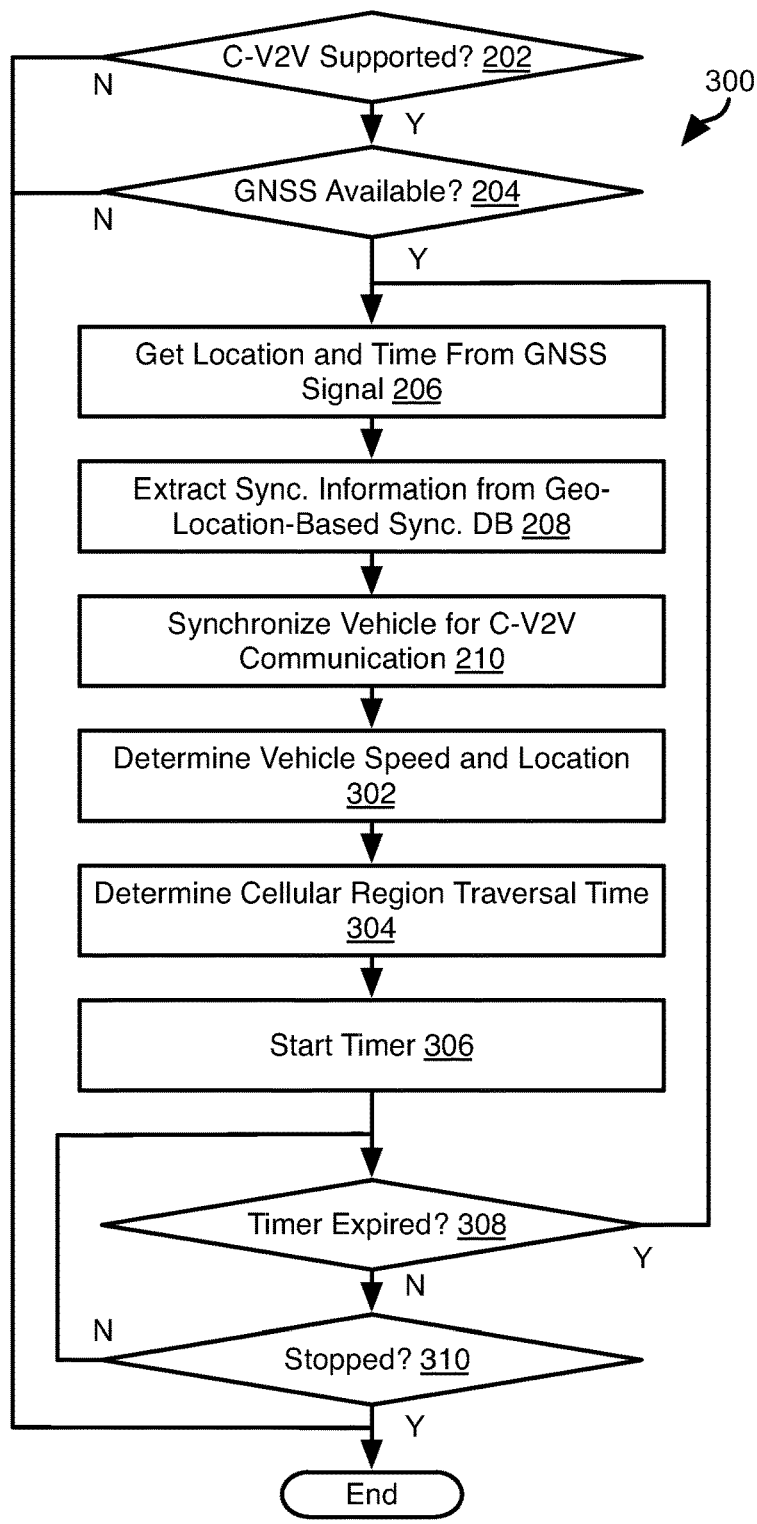
FIG. 3 is a process flow diagram of an alternative method for synchronizing a cellular V2V communication system in accordance with an embodiment of the present invention.

FIG. 3 illustrates an alternative method 300 for synchronization that may be performed using the embodiments of 100*a* or 100*b*. The method 300 may include performing synchronization according to steps 202-210 in the same manner as for the method 200.

The method 300 may further include determining 302 a speed and location of the vehicle, such as by using location information from GNSS signals to determine a location, rate of change of location (velocity), and a direction of movement. Velocity may also be obtained from a compass and vehicle speed sensor of the vehicle's drive train.

The method 300 may then include determining 304 an estimated time of traversal of the cellular region from step 208. Inasmuch as the cellular regions overlap, this estimated time need not be precise. For example, given a velocity and position of the vehicle and assuming a straight trajectory, a time of arrival at the boundary of the cellular region may be calculated. This may or may not take into account actual roads within the cellular region.

The method 300 may then include starting 306 a timer that counts down from the traversal time. When the timer is found 308 to be expired, the method 300 continues at step 206.

If the timer is not expired and the vehicle is found 310 to be stopped, then the method 300 ends inasmuch as further synchronization and accessing of the synchronization database 132 may no longer be needed.

Various additions and modifications to the above-described methods may be implemented.

For example, the communication system 100*a*, 100*b* may periodically update cellular base-station synchronization parameters from a cellular base station V2V signal extracted either from signaling from another vehicle or directly from a base station.

In a scenario where a location is extracted from non-GNSS sources or GNSS are not available, a primary source of synchronization may be cellular base station signal received directly or extracted from another vehicle or relay entity signal, which might be using a cellular base station signal.

In other scenarios where GNSS is available and a base station signal is also available, the base station information can be used in conjunction with the above-described embodiments.

In the above scenarios where a base station signal is used for synchronization, cellular communication between vehicles may still be performed directly rather than being by way of the base station In another embodiment, the timing synchronization signal may be derived from an in-vehicle navigation and map system 138, such as using a GNSS receiver of the in-vehicle navigation system 138. Accordingly, the cellular region in the database 132 may be identified using the location from the in-vehicle navigation system 138. In such embodiments, time information may also be received from the in-vehicle navigation system 138.

In another embodiment, a separate clock in the vehicle (including but not limited to crystal clock) is used for initial timing, synchronization, and time keeping during C-V2X communication.

In another embodiment, timing information from some or all of GNSS signals, direct or relayed information from a base station, a vehicle navigation system 138, and a clock may be combined and hybridized to increase the availability of C-V2V (or V2X) services to a vehicle. In particular, synchronization may be performed using any one of these approaches that are available with GNSS signals being the preferred approach and being used whenever it is available.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices, 3GPP entities, computer cloud etc. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a vehicle computer:
    (a) receiving signals from a global navigation satellite system;
    (b) extracting time and a location from the signals;
    (c) retrieving, from a pre-loaded database stored in the vehicle computer, communication parameters associated with the location, the pre-loaded database not being received from any cellular base station; and
    (d) initiating communication with another vehicle according to the communication parameters;
    wherein the vehicle computer comprises:
    a cellular vehicle-to-vehicle (C-V2V) component including a first cellular antenna; and
    a cellular data communication component including a second cellular antenna, the C-V2V component being isolated from the cellular data communication component such that the C-V2V component is isolated from communications by the cellular data communication component that use a subscriber identity module (SIM) of the cellular data communication component;
    the method comprising performing (a) through (d) by the C-V2V component.

2. The method of claim 1, wherein the communication parameters include a communication frequency.

3. A method comprising, by a vehicle computer:
    (a) receiving signals from a global navigation satellite system;
    (b) extracting time and a location from the signals;

(c) retrieving, from a pre-loaded database stored in the vehicle computer, communication parameters associated with the location, the pre-loaded database not being received from any cellular base station; and (d) initiating communication with another vehicle according to the communication parameters;

wherein the communication parameters include a master information block (MIB) and a system information block (SIB) according to $3^{rd}$ Generation Partnership Project (3GPP).

4. The method of claim 3, wherein the communication parameters include C-V2X (Cellular Vehicle to Everything) synchronization preconfigured parameters.

5. The method of claim 1, wherein (d) comprises allocating communication resources among multiple vehicles according to the communication parameters.

6. The method of claim 1, further comprising performing (a) through (d) without accessing subscriber identification information of the cellular data communication component.

7. A method comprising, by a vehicle computer:

(a) receiving signals from a global navigation satellite system;

(b) extracting time and a location from the signals;

(c) retrieving, from a pre-loaded database stored in the vehicle computer, communication parameters associated with the location, the pre-loaded database not being received from any cellular base station;

(d) initiating communication with another vehicle according to the communication parameters;

(e) initiating a timer; and (f) upon expiration of the timer, repeating (a) through (f);

wherein initiating the timer comprises:
  determining a location and velocity of a vehicle housing the vehicle computer;
  determining a traversal time to leave geographic region associated with the communication parameters; and
  initiating the timer to count down from the traversal time.

8. A vehicle comprising, a vehicle-to-vehicle (V2V) communication system programmed to:

(a) receive signals from a global navigation satellite system (GNSS);

(b) extract time and a location from the signals;

(c) retrieve, from a pre-loaded database stored in the vehicle computer, communication parameters associated with the location, the pre-loaded database not being received from any cellular base station, the communication parameters including a communication frequency; and (d) initiate and maintain communication with another vehicle according to the communication parameters independent of any cellular base station;

wherein the V2V communication system comprises:
  a cellular vehicle-to-vehicle (C-V2V) component including a first cellular antenna; and
  a cellular data communication component including a second cellular antenna, the C-V2V component being isolated from the cellular data communication component such that at least one of (a) the C-V2V component is a separate process from a process implementing the cellular data communication component and (b) the C-V2V component is a separate circuit from, the C-V2V component being programmed to perform (a) through (d).

9. The vehicle of claim 8, wherein the V2V communication system is further programmed to perform (d) by allocating communication resources among multiple vehicles according to the communication parameters.

10. The vehicle of claim 8, wherein the C-V2V component is further programmed to perform (a) through (d) without accessing subscriber identification information of the cellular data communication component.

11. The vehicle of claim 8, wherein the V2V communication system is further enabled to receive the time and the location from an in-vehicle navigation system of the vehicle.

12. The vehicle of claim 8, wherein the V2V communication system is further programmed to obtain the time from an internal clock of the vehicle in the absence of the signals from the GNSS.

13. A vehicle comprising, a vehicle-to-vehicle (V2V) communication system programmed to:

(a) receive signals from a global navigation satellite system (GNSS);

(b) extract time and a location from the signals;

(c) retrieve, from a pre-loaded database stored in the vehicle computer, communication parameters associated with the location, the pre-loaded database not being received from any cellular base station, the communication parameters including a communication frequency; and (d) initiate and maintain communication with another vehicle according to the communication parameters independent of any cellular base station;

wherein the communication parameters include a master information block (MIB) and system; and wherein the communication parameters include C-V2X (Cellular Vehicle to Everything) synchronization preconfigured parameters.

14. A vehicle comprising, a vehicle-to-vehicle (V2V) communication system programmed to:

(a) receive signals from a global navigation satellite system (GNSS);

(b) extract time and a location from the signals;

(c) retrieve, from a pre-loaded database stored in the vehicle computer, communication parameters associated with the location, the pre-loaded database not being received from any cellular base station, the communication parameters including a communication frequency;

(d) initiate and maintain communication with another vehicle according to the communication parameters independent of any cellular base station (e) initiate a timer; and (f) upon expiration of the timer, repeat (a) through (f)

wherein the V2V communication system is further programmed to initiate the timer by:
  determine a location and velocity of a vehicle housing the vehicle computer;
  determine a traversal time to leave geographic region associated with the communication parameters; and
  initiate the timer to count down from the traversal time.

15. The vehicle of claim 14, wherein the V2V communication system is further programmed to suppress repeating (a) through (f) in response to detecting that the vehicle is stopped.

* * * * *